(No Model.)
H. LEMP.
ARMATURE FOR DYNAMO ELECTRIC MACHINES.
No. 376,326. Patented Jan. 10, 1888.
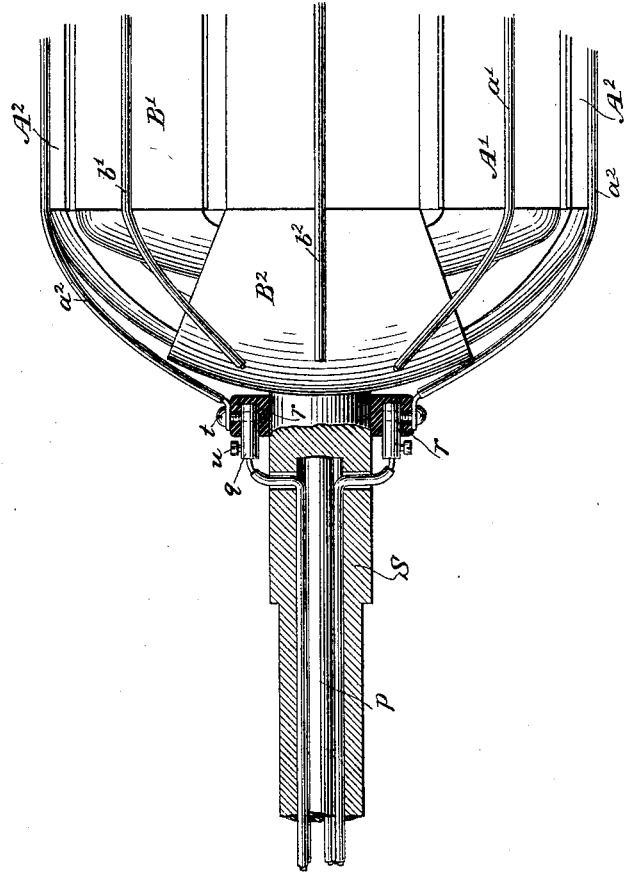
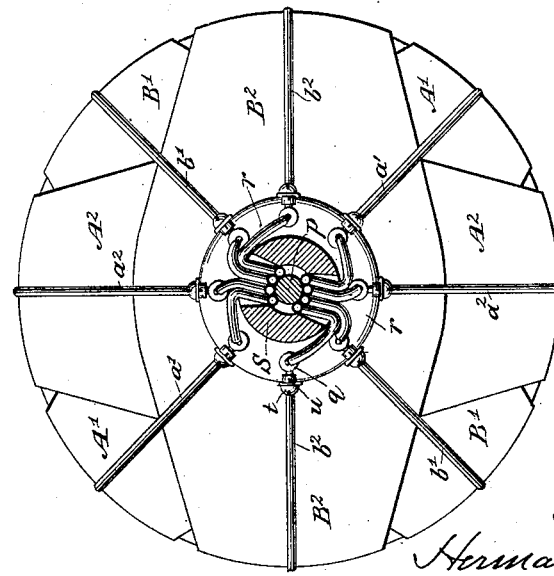
Witnesses
Geo. W. Breck
Carrie E. Ashley
Inventor
Hermann Lemp
By his Attorneys
Fowler & Fowler

UNITED STATES PATENT OFFICE.

HERMANN LEMP, OF HARTFORD, ASSIGNOR TO THE SCHUYLER ELECTRIC COMPANY, OF MIDDLETOWN, CONNECTICUT.

ARMATURE FOR DYNAMO-ELECTRIC MACHINES.

SPECIFICATION forming part of Letters Patent No. 376,326, dated January 10, 1888.

Application filed September 7, 1886. Serial No. 212,905. (No model.)

*To all whom it may concern:*

Be it known that I, HERMANN LEMP, a citizen of the United States, residing at Hartford, in the county of Hartford and State of Connecticut, have invented a new and useful Improvement in Armatures for Dynamo-Electric and other Electrical Machines, of which the following is such a full, clear, and exact description as will enable any one skilled in the art to which it appertains to make and use the same, reference being had to the accompanying drawings, forming part of this specification.

My invention relates to means for connecting the armature-coils with the shaft-wires leading to the commutator sections of an electrical machine.

The object of the invention is to facilitate the connecting of such coils with the shaft-wires, to allow an immediate location of faults in the individual coils in cases of accident, and to give the apparatus a more finished appearance.

Heretofore the leading-in wires of the armature have been soldered directly to the shaft-wires, which pass through holes drilled in the shaft and are carried through the hollow shaft to the commutator-sections, the whole being wrapped several times with tape and string. In order to ascertain which of the shaft-wires belongs to any given armature-coil in such an arrangement, it is necessary to employ different-colored shaft-wires, or to distinguish the wires from one another by means of a code. To locate faults in such a construction, it is necessary each time the commutator is changed, or whenever an accident occurs, to scrape the insulation from the wires, so that the circuit can be tested with a current. Under the new arrangement devised by me and comprising this invention these objections are overcome.

My invention consists in a ring or annular body having connections for establishing the circuit between the leading-in wires of the armature-coils and the shaft-wires, the said ring being exteriorly located so as to be readily accessible and the connections so made as to be readily detachable. The said shaft-wires are taken in groups and passed through two holes, diametrically opposite, drilled in the shaft, and extend through the hollow shaft, into which an insulating-plug may be driven, so as to prevent them from becoming entangled or mixed up, holding them in their relative positions with reference to the coil-wires, so that at a glance the coil to which they belong can be discerned.

In the accompanying drawings, forming part of this specification, in which like letters of reference indicate the same parts, Figure 1 represents an end view of my invention applied to an armature; and Fig. 2 represents a side view of my invention, partly in section.

S represents the hollow shaft of an armature. Into this shaft are drilled two holes or slots diametrically opposite, through which pass the shaft-wires in groups of four. Around this shaft I place a ring of insulating material, $r$, which is provided at regular intervals around it with eight screw-connections. These connections may be of any number, and consist of metal plugs $q$, bearing binding-screws $t\,u$. The outward end of these plugs may be made hollow, to receive the ends of the shaft-wires, against which the screw $u$ is adapted to be screwed. The screws $t$ subserve the double function of a binding-screw for the coil-wires and a means for holding the metal plugs in the ring $r$. I do not wish, however, to limit myself to any particular means of making these connections, as the same may be done in various ways.

The coils are designated by the letters $A'\,B'$ and $A^2\,B^2$. The wires corresponding to these different coils are designated by corresponding small letters, the index of which indicates the coil to which they belong, wires having letters with the index 1 in the drawings belonging to the coils $A'\,B'$, and wires having letters with the index 2 being part of the coils $A^2\,B^2$. I do not wish, however, to limit myself to any number of coils, as any number can be used.

To prevent the shaft-wires from becoming intermingled and losing their identity, they are given a certain radial position in the shaft agreeing with the radial position of the coil from which they emanate, and then an insulating-plug, $p$, may be driven into the hollow interior of the shaft, so as to hold the shaft-wires in position and maintain them in a corresponding position with the coil-wires, so that upon an inspection of the end of the shaft the wire from any given coil can be readily located at a glance.

I do not wish to limit myself to the exact construction shown, as the same may be varied without departing from the spirit of my invention, and I reserve the right in practice to make all changes that fall within the scope of what I now desire to claim.

I claim—

1. The combination, in a dynamo or other electrical machine, of a hollow shaft carrying the armature, leading-in wires from the commutator-sections passing through the interior of said hollow shaft and emerging from holes in the same near the armature-coils, an insulating-base arranged near by upon said armature, and individual binding-posts upon said insulating material for connecting each particular shaft-wire with its respective coil only, substantially as and for the purpose set forth.

2. The combination, with the leading-in wires of the armature-coils of a dynamo or other electrical machine, of a device exterior to said armature and its shaft, carrying connections for said leading-in wires and the shaft-wires from the commutator, and an insulating-plug within the shaft for holding the shaft-wires in their relative position, as set forth, whereby the shaft-wires belonging to each coil can be readily distinguished and faults in the individual coils immediately located.

3. The combination, with the leading-in wires of the armature-coils of a dynamo or other electrical machine, of an insulating-annulus surrounding and moving with the armature-shaft, and bearing connections for said leading-in wires and the shaft-wires from said commutator-sections, and an insulating-plug for holding said shaft-wires in place in the shaft, as set forth.

4. The combination of the leading-in wires of the armature-coils, as $a'\,b'$ and $a^2\,b^2$, the ring $r$, of insulating material, carrying metal plugs $q$, having binding-screws $t\,u$ thereon, the former serving to hold the plugs in place, with the insulating-plug $p$ and the shaft-wires, all substantially as and for the purpose described.

In testimony whereof I have hereunto set my hand and seal, this 3d day of September, 1886, in the presence of two subscribing witnesses.

H. LEMP. [L. S.]

Witnesses:
    MERLE J. WIGHTMAN,
    IRVING BUTLER.